United States Patent Office 2,793,995
Patented May 28, 1957

2,793,995

FIBROUS SEALING COMPOSITION FOR POROUS FORMATIONS AND METHOD FOR MAKING THE SAME

Homer L. Twining, San Antonio, Tex.

No Drawing. Application December 15, 1953, Serial No. 398,423

5 Claims. (Cl. 252—8.5)

This invention comprises novel and useful improvements in a fibrous sealing composition for porous formations and method for producing the same, pertains generally to the art of drilling wells for the purpose of obtaining oil, gas or other fluids from subterranean deposits, and more particularly has reference to a fibrous sealing composition for cavernous or porous formations for preventing the partial or complete loss of circulation during rotary drilling operations or loss of the drilling fluid when drilling with cable tools and to a method of manufacturing such a composition.

The present invention is similar in subject matter to that set forth in the prior patent of John G. Campbell and Homer Twining, No. 2,599,745, granted on June 10, 1952 and constitutes improvements in such compositions and in the method of manufacturing the same; and is a continuation-in-part of my prior copending application, Serial No. 267,700, filed January 22, 1952 for Drilling Fluid Additive, now abandoned.

As employed in the specification, the term "drilling fluid" is understood to cover all types of drilling fluids, particularly circulating liquid drilling fluids and especially includes the numerous types of drilling muds.

It is well understood that maintenance of circulation of the drilling fluid is vital to the operation of drilling and/or treating wells. The failure to maintain circulation, arising from the theft of the drilling fluid by the penetration into a porous or cavernous "thief" formation is known as "lost circulation" or "loss of returns" and produces a considerable number of detrimental and often disastrous results which are so well known to those skilled in this art as to not require specific enumeration here. It is therefore the vital problem of the driller to maintain circulation; or to re-establish and regain a lost circulation.

The problem of lost circulation is generally encountered in oil well drilling by the rotary method. As the drilling fluid is circulated in the bore hole under pressures exceeding that of the formation, the solid particles suspended in the fluid and also the colloidal ingredients of the fluid flow into the formation through interstices, passages, fissures and pores of the formation material. Loss of circulation, however, is not encountered unless the size of the interstices or pores increases to the point where the clay particles, present as a component of the drilling mud, cannot form a bridge across and thus seal these openings. The critical value of this pore diameter of a formation varies with different drilling muds, and even with the same mud, considering the fact that during the drilling process a portion of the clay formation penetrated usually becomes part of the drilling fluid, thereby altering its characteristics. If the pore diameter of a zone exceeds this critical value, then loss of fluid occurs until suspended solid particles plug or reduce the pore size below the critical diameter, permitting the clay particles to function in forming a fluid impervious sheath. If the effective size of such pores can be sufficiently reduced as by bridging the same, the component clay particles of the drilling mud will be enabled to gather or pack into a non-porous mass thereby sealing the porous formation and preventing further loss of drilling mud thereto.

It is well known that drilling fluids are of many different compositions and require many varied characteristics in order to properly function in the widely varied conditions and requirements of different well formations. The compositions and properties of any particular drilling fluid are therefore critical for a particular well and must be maintained within relatively narrow limits. Any additive admixed therewith, as a lost circulation material or sealer, must be such as to not detrimentally affect the characteristics of the mud as found to be desirable for that well.

Voluminous records carried by the well drilling industry conclusively establish that the trend each year is toward deeper wells in the effort to find more oil. This trend results in steadily increasing hydrostatic pressures upon the drilling fluids, resulting in more frequent and serious loss of returns. In order to seal such losses, any sealing agent must be capable of withstanding such relatively enormous pressures in order to re-establish and maintain circulation.

A fibrous material, to be acceptable as a lost circulation additive, must possess the properties of high tensile strength, great flexibility, being chemically neutral and of not deteriorating after long periods in a drilling fluid.

In addition, it is extremely desirable that the fibrous material shall be economical as to cost, capable of use in all of the various techniques and practices of well drilling, and capable of being readily removed from an oil bearing formation when completing a well.

It is believed that all of the known textile fibers possess the essential properties to some extent. As set forth hereinafter, rags and textile fiber wastes are a satisfactory source for such fibers. Wood fibers, when properly prepared and conditioned, constitute a satisfactory and a more economical source of fibers than rags or textile fiber wastes.

The essential and fundamental purpose of this invention is to seal a thief formation or prevent loss of circulation thereto.

Accordingly, an object of the invention is to provide suitable fibrous lost circulation materials or additives for mixing with drilling fluids for the purpose of preventing loss of circulation thereof and/or to restore a lost circulation, which materials will be relatively simple and inexpensive, will not detrimentally alter the characteristics of the drilling fluids, and which will have such coaction with the voids and cavities of any permeable formation encountered in the drilling operation as to reduce the effective pore size and enable the establishment of a strong and reliable seal therefor.

Another object is to provide a drilling fluid additive which may consist substantially entirely of fibrous material or may comprise a mixture of fibrous material and granular material in suitable proportions.

Another object is to provide a drilling fluid additive which may be used with other additives without detrimental effects to condition the fluid or prevent loss of the same.

Yet another very important purpose is to provide a drilling fluid additive which shall be capable easily and with certainty to effectively seal thief formations under the increasingly heavy hydrostatic heads of deep well drilling.

In order to perform acceptably under present day requirements, a satisfactory lost circulation material must be amenable to various methods of application to a thief formation, as by the "pill" method wherein a dose or slug of material is placed or spotted at a lost circulation zone with precision and economy and for maximum effectiveness.

A further object of the invention is to provide a drilling fluid additive for sealing porous formations penetrated by the well bore and which will not interfere with the pumping of the drilling fluid, which will not deteriorate and which will not readily separate out of the drilling fluid, even for long periods after its admixture with the fluid.

In the search of the industry for an inexpensive and all-purpose drilling fluid additive, many materials have been tried out, but only a relatively few selected compositions are in use today, generally as a mixture of some fibrous material with granular material.

The following are some of the better known and more frequently used additives for improving the formation sealing properties of ordinary drilling fluids: glue, casein, gelatin, gum arabic, cobal seaweed, cotton seed hulls, linseed cake, wheat flour, psyllium seed, mica flakes, asbestos fibers, shredded bagasse, shredded redwood bark, Balsam wood wool and paper pulp. Since the drilling well operator rarely has a means of knowing what sort of formations is responsible for his loss of circulation, it follows that difficulty is experienced in finding any one material which will seal the pores and cavities of the various formation with equal effectiveness.

As a prerequisite, it is obviously necessary that the material function in a manner to establish a seal on the inside of a porous formation or theft structure. Also, the material must be tough and strong to withstand the increasingly greater pressures encountered in drilling, and the material must seal the various formations although without producing a coating or sheath protruding into the well bore and commonly known as a filter cake, since otherwise the seal would be destroyed by the drill in its movements up and down the well bore.

A basic feature of this invention is to provide a sealing composition having a fiber mass to form a bridging mat within a porous formation with which a granular filler, which may be clay particles and/or other granular particle additives, may cooperate to form an impervious seal.

The materials of the present invention adequately fulfill the above requirements for a successful all-purpose additive, since they are primarily composed of tough and flexible fibers that have the ability to work their way within and establish a bridge or mat within widely varying sizes of pores and cavities of the thieving formations to effectively plug and seal them, and which, in producing a seal, do not develop a filter cake of any appreciable size projecting into the well bore.

A still further very important object of the invention is to provide an additive in conformity with the preceding objects, which can be employed to prevent loss of circulation when a porous structure is encountered in an oil bearing formation, to thereby enable completion of the well bore; and which can be readily removed, as by an acid treatment, when it is desired to bring in the well.

*Rag fibers*

As set forth in my prior copending application, Serial No. 267,700, the fibrous material may satisfactorily consist of a mass of loose fibers, interwoven or interlocked groups of fibers, such as pieces of cloth or the like, or a mixture of both. Since the interwoven fibers of cloth fragments are already intermingled and interlocked with each other, this material will in general facilitate and hasten the forming of a mat or skeletal bridge within a porous formation.

At the present time, fibers are used in lengths up to about four inches. This limit is observed only because fibers in excess of that length have been found to clog the valves of the mud circulation pump. Insofar as the fibers' performance in the well bore is concerned, it is believed that the longer fibers of lengths approaching and exceeding four inches are extremely beneficial and effective in deep penetrations of the intersticial structure and function to effect successive re-establishment of seals within the formation which may have been ruptured by hydrofraction.

It should be especially noted that only flexible, long fibers of high tensile strength can perform this last mentioned, highly valuable function.

I have found that the use of rags in various forms, either chopped, cut, ground or shredded, as the fibrous constituent of a drilling mud additive, improves the same in all respects and has the advantage of cheapness, availability of the necessary raw materials, and inexpensive processing operations. In particular, the invention contemplates the use of rags, textile waste, and sweepings from carpet factories. Under the category of rags, there is included the following materials: rayon, silk, cotton, linen, nylon, wool, jute, flax, hemp, mohair, burlap, ramie and bemberg and synthetic fibers in addition to rayon and nylon. Rayon and silk waste have been processed for purposes of the present invention in addition to wiping rags, misprints, remnants, mill ends, carpet and rug waste and textile wastes which produce remnants of linen, canvas, cotton or wool cloth, and similar material such as may be purchased under the general category of rags.

In the processing of rags, they may be chopped, cut, shredded or ground. Chopped or cut rags are exactly what the name implies. The rags have been chopped or cut in various sizes and shapes, with some square, others triangular, and still others as strips, all including large and small pieces ranging in area from one-fiftieth of a square inch to one square inch or even larger. The particular size and fiber composition of the rags in chopped condition will, of course, be varied, depending on the type of thieving formation for which the additive of the invention may be designed. Also, the chopping or cutting of the rags may be performed as a special step in the processing, although it is possible to buy rags in this condition on the market. For shredding or grinding the rags, they may be efficaciously passed through a hammer mill, or through a rag cutter. Rags passed through the hammer mill once are referred to as first run rags. The product may be described as partly a fibrous mass and partly a mixture of large and small pieces of chopped rags or cloth. The first run through a hammer mill may not completely grind the rags to a fibrous mass, and various sized chopped pieces might remain.

It may therefore be necessary to pass the rags through the mill at least a second time to secure a substantially one hundred percent fibrous mass. The same are known as second run rags.

Any other means or processes may be employed for reducing the rags in whole or in any desired proportion to a mass of fibers.

The rags, either in chopped form, a fibrous mass, or any other desired proportion of these, contain tough and flexible fibers which will readily conform to the shapes of various sized cavities in the thieving formation. Accordingly, this mass of fibrous material readily enters the interstices of the formation under the pressure of the drilling fluid and functions to effectively plug and seal within the formation, preventing further loss of drilling fluid.

A series of tests has been conducted to determine the efficacy of rags alone as a sealing agent or loss circulation material. The tests were conducted with 2000 cc. of a mixture containing the additive in a proportion of three pounds per barrel of mud, with a maximum test pressure available of 2000 p. s. i. and a filter pack of gravel screened through a one-half inch screen and retained on a one-quarter inch screen. The following tables tabulate the results of three such tests:

| Test No. | Material Tested | Pressure Sustained, lbs. | Rupturing Pressure | Drilling Fluid Lost Before Establishing Seal, cc. | Extent of Penetration of Fibers into Test Bed, inches |
|---|---|---|---|---|---|
| 1 | Ground Rags (all fiber). | 2,000 | None | 700 | 1 |
| 2 | Chopped Rags (fiber and particles). | 2,000 | None | 600 | 1¼ |
| 3 | 50% Chopped Rags and 50% Ground Rags. | 2,000 | None | 800 | ½ |

From the foregoing, it will be apparent that rag fibers constitute a very effective material for establishing a seal in a porous or thieving formation to prevent the loss of circulation therein, and deeply penetrate into the interstices of the formation.

Another admix subjected to a series of tests and found satisfactory was a combination of rags constituting the fibrous material and sawdust as the granular material. Sawdust having a particle size of approximately No. 4 was employed in this particular composition, although different formations may require a sawdust of a different particle size, and for general use, it will be desirable to use sawdust of a graded size, ranging from 0.006 to 0.200 inch in diameter or larger. In addition to sawdust, rice hulls, cotton seed hulls and ground corn cobs may be used as the granular filler material. More specifically, the fibers of the fibrous materials may range in length from one-eighth inch to four inches or more, depending on the ability of the pump of the drilling fluid to handle the large fibers. The sawdust or other granular material used in the additive may have a composition as follows:

| | Percent |
|---|---|
| Retained on No. 4 screen | 0 |
| Passing No. 4 but retained on No. 8 | 5 |
| Passing No. 8 but retained on No. 16 | 10 |
| Passing No. 16 but retained on No. 30 | 40 |
| Passing No. 30 but retained on No. 50 | 30 |
| Passing No. 50 | 15 |

In this specification, the term sawdust is used with the connotation employed in the lumber industry, including not only the granular material produced by the saw but also chopped, ground or comminuted shavings and pieces of wood, however produced, and which are graded and supplied in the industry under the same screening numbers and processes and under the general terms of sawdust.

The proportion of fibrous material to granular filler material in the composition may be widely varied and any proportion may be employed from a very high fiber content additive consisting of rags either in cut or chopped form or in fibrous form, as ground or shredded rags, or a combination of the two, to one containing a major portion or very high content of granular filler. A satisfactory composition may range from one-third fibrous material and two-thirds granular filler to seventy-five percent fibrous material and twenty-five percent granular material. In general, however, over fifty percent of granular material reduces the effectiveness of the sealing action. A more specific example consists of an additive containing two-thirds rags and one-third sawdust graded as to particle size, as above set forth.

The fibrous material including the rags as herein described may be used as an additive for any and all types of drilling fluids and drilling muds. Also, the same may be used following the addition to the fluid of other sealing materials and/or other treating materials. In the grinding or shredding of the rags for use in the present additive, a textile fiber is produced which, of course, can be duplicated by the use of the fiber in its natural state and before the same is processed into cloth, carpeting or the like. Rags, with or without a granular filler, will usually produce a satisfactory sealing material for preventing loss of circulation in the drilling of a well. As stated, a mixture of first and second run rags may be used, or the additive may comprise all first run rags or all second run rags.

Textile fibers, in the natural state, may be substituted for the rags. As described in the above identified patent of Campbell and Twining, the textile fibers may consist of the following: jute, hemp, flax, mohair, lechuguilla fibers, synthetic fibers, cotton, cotton linters, wool and wool shoddy. An additive consisting of rags only or of textile fibers only is naturally more expensive than an additive having some granular filler, such as sawdust in admixture therewith. All the textile fibers will produce a good seal when used alone, with the exception of hemp. When hemp is used, a granular filler should be added to the same, or the hemp fiber can be mixed with other textile fibers or with rags. In fact, any of the textile fibers can be mixed to produce a satisfactory seal, and a seal may result which may be better than any one fiber will produce when used by itself. Also, rags may be substituted for the textile fibers without loss of any of the desirable characteristics that make the present additive outstanding as regards its merit. For cementing a particularly troublesome formation of the cavernous type, it is entirely possible to use the present additive in combination with cementitious material.

The use of strands or rolled or twisted fibers, as a source of textile fibers should not be overlooked. For example, various types of reclaimed or salvaged fibers, such as the rolled or twisted strands and cords found in the carcasses of automobile tires from which the rubber has been reclaimed, may constitute a satisfactory source of fibers.

In a cementing operation using Portland cement, for instance, the cement is mixed with water, sometimes bentonite being added. To the cement and water mixture, the present sealing material is added and the same is then forced down the drill stem, shoving ahead of it the drilling fluid remaining in the drill stem. Specified amounts of water, cement and sealing material mixture are pumped into the drill stem, ultimately causing the mixture to enter the cavities of the thieving formation. Following this operation, drilling mud or water is again pumped into the drill stem, forcing the residue of the cement mixture from the same. Drilling operations are discontinued until the cement has had time to harden, whereupon drilling is again resumed.

It is also possible to use the present additive in conjunction with the present conventional practice of applying a gel plug as a sealer. A gel plug makes use of bentonite, a clay substance that has the property of expanding and swelling when water is mixed with it. In this operation, the bentonite is mixed with oil which does not cause it to expand, and the mixture is pumped down the drill stem into the thieving formation. The present sealing material can be added to the mixture of bentonite and oil prior to the pumping operation. When the mixture reaches the thieving formation, it comes in contact with the water which causes the bentonite to expand and to take a set, which action seals off the porous area so that drilling operations can be resumed.

*Wood fibers*

Textile fibers are considered to be the best of all fibrous materials for a lost circulation additive. In view of the relatively high cost, when used in large quantities, however, it is frequently desirable to employ a somewhat less efficient but considerably more economical fiber, especially where a bulk filler is needed. Wood forms a very satisfactory source for fibers in such instances.

When properly prepared, wood fibers will meet all of the requirements of a satisfactory additive. The cells of wood fibers, in their natural state, are filled with lignin, a resinous material. While the latter strengthens the fibers, it unfortunately renders them stiff and brittle. Since a stiff and brittle fiber will not easily penetrate a pore, it does not form an effective sealing material. It is therefore necessary to remove the lignin, or delignify the wood, before its fibers are suitable for a lost circulation material. In addition, it is also desirable to remove all resins and tars from the wood and to render the latter chemically neutral and inactive.

In some instances, waste from wooden products, already so treated as to be a satisfactory source of fibers, can be used. By using the off-falls from certain manufacturing operations of wood products, a very durable pliable and flexible wood fiber is produced. For example, in the production of battery separators, the wood is cooked for about sixteen hours at 212° F. in a solution of three percent caustic soda. The wood is then washed and rinsed to remove traces of the alakli. The treatment also removes all resins and tars from the wood. The off-falls from such a wood manufacturing operation or the chips, waste pieces and shavings of any species of wood can be so treated and then ground or shredded in a hammer or attrition mill or other machinery to produce a mass of fibrous wood which is strong and flexible, and which will function very satisfactorily as a drilling fluid additive.

The wood may be reduced to a mass of fibers in any known manner. For example, grinding or shredding a block of wood, while wet, has been found to produce suitable fibers. Practically every species of wood can be used as a source of wood fibers. It is found to be generally preferable to provide the wood in the form of thin slabs about one-quarter inch thick and to boil them in a three percent caustic solution for two to three hours to delignify them. Then, they are rinsed for about ten to thirty minutes in a boiling bath of a neutralizer to render them chemically neutral. Next, they are ground or shredded in any known manner to produce moist fibers.

The fibrous wood mass may be supplemented to increase its effectiveness as a drilling fluid additive by the addition thereto of a granular filler, such as sawdust, rice hulls, cotton seed hulls or ground corn cobs. To this compounded mixture may be added textile fibers or rags, either chopped, cut, ground or shredded, in any desired proportion. Cotton, cotton linters, wool, wool shoddy, jute, ramie, linen or other natural fibers or synthetic fibers and the like may comprise the source for the textile fibers. By taking any of these fibers and adding sawdust, graded as to particle size, a drilling fluid additive of merit can be produced. The percentage of the various ingredients may vary widely. One satisfactory composition will range from fifty percent wood fiber and fifty percent sawdust to forty percent wood fiber, twenty percent textile fibers and forty per cent sawdust. Different combinations of the above ingredients may be compounded to produce a drilling fluid additive for special drilling operations. For example, a composition consisting of fifty percent wood fiber, twenty-five percent sawdust and twenty-five percent textile fibers or rags has proven to be satisfactory. The proportions of the various ingredients may be widely varied. In general, an increase in the proportion of textile fibers increases the efficiency of the mixture.

Some fibrous material must be present in order to bridge the pores and cavities of the porous formation and withstand pressure. The fibers interlace with each other and function as an initial seal. As a result, the pores and cavities are progressively reduced in size. The function of the filler material, such as the sawdust, is to complement the fibers in plugging the mat formed by the fibers. Obviously, the proportions of the fibrous material, whether textile fibers, synthetic fibers, rag fibers or wood fibers and the granular filler material may be widely varied as expediency dictates.

As above set forth, textile and rag fibers are entirely satisfactory for performing all types of sealing operations for preventing loss of circulation of drilling fluids. It will be readily apparent, however, that the high rag fiber content of a composition may prove to be a heavy expense in sealing operations which require a large number of barrels of the composition, in view of the present relatively high cost of rag fibers. I have discovered that in some instances, the cost of the composition may be materially lessened by the substitution of wood fibers for varying portions of the rag fibers, thereby substituting a less expensive material for a more expensive one. While such substitution probably results in a poduct which will stand somewhat less pressure than will a composition consisting entirely of rag fibers with a granular filler, the loss in strength of the composition can be tolerated.

In some instances, where the mud is not being subjected to heavy pressure, a one hundred percent wood fiber additive may give satisfactory results.

As an example, the following test was run under the same conditions as tests 1–3 above:

| Test No. | Material Tested | Rupturing Pressure | Extent of Penetration of Fibers into Test Bed |
|---|---|---|---|
| 4 | Delignified Wood Fibers | 750 | ½ inch. |

Further tests under the same conditions as tests 1–4 above but using varying amounts of textile fibers and/or granular materials in addition to the wood fibers gave excellent results, as follows:

| Test No. | Material Tested | Pressure Sustained, lbs. | Rupturing Pressure, lbs. | Drilling Fluid Lost Before Establishing Seal, cc. | Extent of Penetration of Fibers into Test Bed, inches |
|---|---|---|---|---|---|
| 5 | 50% Delignified Wood Fibers and 50% No. 4 Sawdust. | | 1,500 | | 1½ |
| 6 | 90% Delignified Wood Fibers and 10% Ground Rags. | | 1,550 | | 1 |
| 7 | 45% Delignified Wood Fibers, 45% No. 4 Sawdust and 10% Chopped Rags. | 2,000 | None | 1,800 | 1 |
| 8 | 50% Delignified Wood Fibers, 25% No. 4 Sawdust and 25% Ground Rags. | 2,000 | None | 1,200 | 1 |
| 9 | 50% Delignified Wood Fibers, 25% No. 4 Sawdust and 25% Chopped Rags. | 2,000 | None | 900 | 1 |

From the foregoing, it is apparent that when exceptional strength is not required, the much cheaper wood fibers may be substituted for the more costly textile fibers. The cost saving is very appreciable in view of the large quantities of sealing compound which may be required.

For example, the cost of treating a well to restore lost circulation by the use of a sealing compound as a drilling fluid additive may frequently exceed $5,000.00. When cavernous or excessively porous formations are encountered, it may be necessary to completely fill them by bulk material before returns can be restored. For such purposes, the much less expensive wood fibers are economically preferable to the use of the more expensive textile fibers alone.

Acid dissolvable fibers

When a loss of circulation occurs in an oil producing zone or region, as when the drilling operation has reached and penetrated into the oil producing sand, a different situation exits with regard to combatting lost circulation from those previously discussed. In this latter situation, it is of course desired and necessary to prevent a loss of circulation and restore or regain returns, in order that the drilling operation may be completed as a prerequisite to completing or bringing in the well. However, it is essential at this point not to employ such a sealing material or additive that the pore formation will be permanently sealed and thus prevent flow of oil into the well bore. Instead, it is desired to establish a temporary seal which will prevent loss of returns until the drilling operation is completed, but which may be readily removed by various conventional operations, as for example, the usual acid treatment for completion of a well bore, to thus clear the pores of the formation of the sealing and obstructive efforts of the additive and permit free flow of oil from the formation into the well bore.

To accomplish this purpose, the present invention employs under these conditions a lost circulation material or additive which will establish an effective seal in the manner set forth hereinbefore, but which may be readily removed by conventional treatments, such as acidizing. Accordingly, fibers are chosen as additives which may be readily digested or dissolved by the acid treatment of completing a well. Rayon and nylon fibers being readily dissolvable in acid constitute a highly satisfactory fiber for a sealing additive. Silk fibers and rags are also acceptable for this purpose. Wool fibers and rags can likewise be employed although they are not as readily digested by the acid as the previously mentioned fibers.

In introducing a lost circulation additive for maintaining circulation in an oil producing zone, fibers and rags from the above set forth groups are introduced into the well bore in the drilling fluid in any of the conventional manners, and establish a sealing of the porous formations. After the well drilling operation is completed, and it is desired to bring in the well, the lost circulation additive is removed from the porous formation by digesting the same with acids, caustic solutions or in any other manner.

The additive is thus effective to establish a highly effective seal to prevent lost circulation in the oil bearing formation; but can be readily digested or removed as a prerequisite to or as a step in the bringing in of the well.

From the foregoing, the invention will be readily understood and further explanation is believed to be unnecessary. However, since numerous modifications and changes will readily occur to those skilled in the art, it is not desired to limit the invention to the exact embodiments disclosed, and accordingly, all suitable modifications and equivalents may be resorted to, falling within the scope of the appended claims.

What is claimed as new is as follows:

1. A process of producing a sealing additive composed of delignified, flexible and tough wood fibers for drilling fluids which comprises treating wood, while in the form of bodies of unseparated fibers, said bodies being of such size as to produce fibers having a length of from ¼ inch to about 4 inches, with an agent to remove lignin from the cellular structure thereof, rinsing said bodies to remove the treating agent therefrom, shredding the delignified wood bodies to thereby reduce the same to a mass of loose fibers for use as an additive.

2. The process of claim 1 wherein the shredding operation is performed while the wood bodies are wet.

3. The process of claim 1 wherein the shredding operation is performed while the wood bodies are wet from the rinsing operation.

4. The process of claim 1, wherein the bodies of wood are in the form of thin slabs about ¼ inch in thickness.

5. The process of claim 1, wherein the mechanical separation is effected by shredding the bodies of wood after the delignification of the fibers is complete and while the fibers are still wet.

References Cited in the file of this patent

UNITED STATES PATENTS

| | | |
|---|---|---|
| 1,807,082 | Boynton | May 26, 1931 |
| 2,019,452 | Hartford | Oct. 29, 1935 |
| 2,061,616 | Dreyfus | Nov. 24, 1936 |
| 2,064,936 | McQuiston | Dec. 22, 1936 |
| 2,119,829 | Parsons | June 7, 1938 |
| 2,214,366 | Freeland et al. | Sept. 10, 1940 |
| 2,398,347 | Anderson | Apr. 16, 1946 |
| 2,599,745 | Campbell et al. | June 10, 1952 |

FOREIGN PATENTS

| | | |
|---|---|---|
| 12,149/33 | Australia | Apr. 10, 1934 |

OTHER REFERENCES

Langston: Fibrous Materials Aid Restoring Lost Drilling Well Circulation, Article in The Oil and Gas Journal, April 23, 1936, pages 31, 33 and 34.

Silent: Circulation Losses, Article in The Oil and Gas Journal, May 21, 1936, pages 72, 75, 78, 79 and 80.

Sawdon: Lost Circulation in Rotary Holes, Article in The Petroleum Engineer, February 1936, pages 27 to 30.